United States Patent
El Defrawy et al.

(10) Patent No.: US 9,613,292 B1
(45) Date of Patent: Apr. 4, 2017

(54) SECURE MULTI-DIMENSIONAL PATTERN MATCHING FOR SECURE SEARCH AND RECOGNITION

(71) Applicant: HRL Laboratories, LLC, Malibu, CA (US)

(72) Inventors: Karim El Defrawy, Santa Monica, CA (US); Kirill Minkovich, Campbell, CA (US); Joshua W. Baron, Los Angeles, CA (US); Eric P. Tressler, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 355 days.

(21) Appl. No.: 14/205,295

(22) Filed: Mar. 11, 2014

Related U.S. Application Data (63) Continuation-in-part of application No. 13/749,683, filed on Jan. 25, 2013, now Pat. No. 9,009,089.

(60) Provisional application No. 61/591,207, filed on Jan. 26, 2012, provisional application No. 61/778,924, filed on Mar. 13, 2013.

(51) Int. Cl.
G06K 9/62 (2006.01)
H04L 29/08 (2006.01)

(52) U.S. Cl.
CPC ............ G06K 9/6201 (2013.01); H04L 67/10 (2013.01)

(58) Field of Classification Search
CPC ............... G06F 15/18; G06F 17/30247; G06F 17/30985; G06F 21/60; G06F 21/602; G06N 3/02; G06N 3/08; G06K 9/62; G06K 9/6247; G06K 9/6201; H04L 67/10
USPC ........................................................ 706/18
See application file for complete search history.

(56) References Cited

U.S. PATENT DOCUMENTS

| 6,219,794 B1 * | 4/2001 | Soutar .................. H04L 9/0866 713/186 |
| 7,085,418 B2 | 8/2006 | Kaneko et al. |
| 7,599,894 B2 | 10/2009 | Owechko et al. |

(Continued)

OTHER PUBLICATIONS

Landau G. et al., "Pattern Matching in a Digitized Image", Algorithmica, 1994, 12, pp. 375-408.*

(Continued)

*Primary Examiner* — Dave Misir
(74) *Attorney, Agent, or Firm* — Tope-McKay & Associates (57) ABSTRACT

Described is a protocol for multi-dimensional secure pattern matching. The protocol is to be evaluated between two parties, $P_1$ (or Client) and $P_2$ (or Server). $P_1$ holds a multi-dimensional pattern, p, and $P_2$ holds a multi-dimensional text T (where both p and T have the same number of dimensions, but where p may be of smaller length in each dimension compared to T). $P_1$ and $P_2$ would then engage in a protocol that allows $P_1$ to find out whether p is present in T or not. The security and privacy requirements are that $P_2$ does not learn any information about the pattern p nor the result of the matching. $P_1$ should also not learn any information about T other than whether p is present in it or not. Upon implementation of the protocol, p matches T if there exists an m× . . . ×m sub-hypermatrix (or sub-array) of T that equals p.

3 Claims, 8 Drawing Sheets

(56) References Cited

U.S. PATENT DOCUMENTS

| | | | |
|---|---|---|---|
| 7,787,474 B2 | 8/2010 | Van Lunteren | |
| 8,068,431 B2 | 11/2011 | Varadarajan et al. | |
| 2004/0088722 A1* | 5/2004 | Peker | G06F 17/30787 725/19 |
| 2007/0140479 A1* | 6/2007 | Wang | H04L 9/008 380/30 |
| 2008/0005091 A1* | 1/2008 | Lawler | G06F 17/30592 |
| 2009/0119518 A1* | 5/2009 | Staddon | G06F 21/6227 713/193 |
| 2010/0076919 A1* | 3/2010 | Chen | H04L 12/56 706/48 |
| 2014/0121990 A1* | 5/2014 | Baldi | G06F 19/22 702/20 |

OTHER PUBLICATIONS

Wei L. et al., "Third-Party DFA Evaluation on Encrypted Files", Tech. Rep. TR11-005, Depart of Computer Science, University of North Carolina at Chapel Hill, 2011.*
Jonathan Katz and Lior Malka. (2010). Secure text processing with applications to private DNA matching. In Proceedings of the 17th ACM conference on Computer and communications security (CCS '10), ACM, New York, NY, USA, 485-492. DOI=10.1145/1866307. 1866361.
Carmit Hazay, Rosario Gennaro, Jeffrey Sorensen, "Automata Evaluation and Text Search Protocols with Simulation Based Security," Cryptology ePrint Archive Report, 2010/484 (2010).
Mikhail J. Atallah, Florian Kerschbaum, and Wenliang Du. (2003). Secure and private sequence comparisons. In Proceedings of the 2003 ACM workshop on Privacy in the electronic society(WPES '03). ACM, New York, NY, USA, 39-44.
Mikhail J. Atallah and Jiangtao Li. 2005. Secure outsourcing of sequence comparisons. Int. J. Inf. Secur. 4, 4 (Oct. 2005), 277-287.
Juan Ramon Troncoso-Pastoriza, Stefan Katzenbeisser, and Mehmet Celik. (2007). Privacy preserving error resilient dna searching through oblivious automata. In Proceedings of the 14th ACM conference on Computer and communications security (CCS '07), ACM, New York, NY, USA, 519-528, DOI=10.1145/1315245. 1315309.
Marina Blanton and Mehrdad Aliasgari. (2010). Secure outsourcing of DNA searching via finite automata. In Proceedings of the 24th annual IFIP WG 11.3 working conference on Data and applications security and privacy (DBSec'10), Sara Foresti and Sushil Jajodia (Eds.). Springer-Verlag, Berlin, Heidelberg, 49-64.
Robert S. Boyer and J. Strother Moore. 1977. A fast string searching algorithm, Commun. ACM20, 10 (Oct. 1977), 762-772.
Alfred V. Aho and Margaret J. Corasick. 1975. Efficient string matching; an aid to bibliographic search. Commun. ACM 18, 6 (Jun. 1975), 333-340.
Knuth, D.E. Morris, J.H. & Pratt, V.R. (1977). Fast pattern matching in strings, SIAM Journal on Computing. 6(2), 323-350.
Hazey, C. and Toft, T. 2010. Computationally Secure Pattern Matching in the Presence of Malicious Adversaries. ASIACRYPT 2010.
Alfred V. Aho and Margaret J. Corasick. Efficient string matching: an aid to bibliographic search. Commun. ACM, 18: pp. 333-340, Jun. 1975.
Marina Blanton and Mehrhad Aliasgari. Secure outsourcing of dna searching via finite automata. In 24th annual IFIP WG 11.3 working conference on Data and applications security and privacy (DBSec'10), pp. 49-64, 2010.
Taher El Gamal. A public key cryptosystem and a signature scheme based on discrete logarithms. In Proceedings of CRYPTO 84 on Advances in cryptology, pp. 10-18, New York, NY, USA, 1985. Springer-Verlag New York, Inc.
Ronald Cramer, Rosario Gennaro, and Berry Schoenmakers. A secure and optimally efficient multi-authority election scheme. pp. 103-118. Springer-Verlag, 1997.

Ivan Damgård, Efficient concurrent zero-knowledge in the auxiliary string model. In Proceedings of the 19th international conference on Theory and application of cryptographic techniques, EUROCRYPT'00, pp. 418-430, Berlin, Heidelberg, 2000. Springer-Verlag.
Ivan Damgård and Mats Jurik, A generalisation, a simplification and some applications of paillier's probabilistic public-key system. In Proceedings of the 4th International Workshop on Practice and Theory in Public Key Cryptography: Public Key Cryptography, PKC '01, pp. 119-136, London, UK, 2001. Springer-Verlag.
Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.
Jens Groth and Yuval Ishai. Sub-linear zero-knowledge argument for correctness of a shuffle. In Nigel Smart, editor, Advances in Cryptology—EUROCRYPT 2008, vol. 4965 of Lecture Notes in Computer Science, pp. 379-396. Springer Berlin / Heidelberg, 2008.
O. Goldreich, S. Micali, and A. Wigderson. How to play any mental game. In Proceedings of the nineteenth annual ACM symposium on Theory of computing, STOC '87, pp. 218-229, New York, NY, USA, 1987. ACM.
Juan A. Garay, Philip MacKenzie, and Ke Yang. Strengthening zero-knowledge protocols using signatures, In Proceedings of the 22nd international conference on Theory and applications of cryptographic techniques, EUROCRYPT'03, pp. 177-194, Berlin, Heidelberg, 2003. Springer-Verlag.
Carmit Hazay, Rosario Gennaro, and Jeffery Sorensen. Automata evaluation and text search protocols with simulation based security. In Public Key Cryptography, pp. 145-160, 2010.
Heiko Hoffmann, Michael Howard, and Michael Daily. Fast pattern matching with time-delayed neural networks. In Proceedings of International Joint Conference on Neural Networks, San Jose, California, USA, Jul. 31-Aug. 5, 2011, pp. 2424-2429.
Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2008. Springer-Verlag.
Carmit Hazay and Tomas Toft. Computationally secure pattern matching in the presence of malicious adversaries. In ASIACRYPT, pp. 196-212, 2010.
Yuval Ishai, Manoj Prabhakaran, and Arnit Sahel. Founding cryptography on oblivious transfer—efficiently. In Proceedings of the 28th Annual conference on Cryptology: Advances in Cryptology, CRYPTO 2008, pp. 572-591, Berlin, Heidelberg, 2008. Springer-Verlag.
Jonathan Katz and Lior Malka. Secure text processing with applications to private dna matching. In Proceedings of the 17th ACM conference on Computer and communications security, CCS '10, pp. 485-492, New York, NY, USA, 2010. ACM.
Knuth, Donald; Morris, James H., jr; Pratt, Vaughan (1977). "Fast pattern matching in strings". SIAM Journal on Computing 6(2): pp. 323-350.
Richard M. Karp and Michael O. Rabin. Efficient randomized pattern-matching algorithms. IBM J. Res. Dev., 31: pp. 249-260, Mar. 1987.
K. Namjoshi and G. Narlikar. Robust and fast pattern matching for intrusion detection. In INFOCOM, 2010 Proceedings IEEE, pp. 1-9, Mar. 2010.
Pascal Paillier. Public-key cryptosystems based on composite degree residuosity classes. In Proceedings of the 17th international conference on Theory and application of cryptographic techniques, EUROCRYPT'99, pp. 223-238, 1999.
Torben P. Pedersen, Non-interactive and information-theoretic secure verifiable secret sharing. In Proceedings of the 11th Annual International Cryptology Conference on Advances in Cryptoiogy, CRYPTO '91, pp. 129-140, London, UK, 1992. Springer-Verlag.
Al-Khalifa, et al., "Structural joins: A primitive for efficient XML query pattern matching," In Proceedings of the 18th International Conference on Data Engineering, ICDE '02, pp. 141-153, Washington, DC, USA, 2002. IEEE Computer Society.

(56) References Cited

OTHER PUBLICATIONS

Claus-Peter Schnorr. Efficient identification and signatures for smart cards. In Proceedings of the 9th Annual International Cryptology Conference on Advances in Cryptology, CRYPTO '89, pp. 239-252, London, UK, 1990, Springer-Verlag.
Juan Ramón Troncoso-Pastoriza, Stefan Katzenbeisser, and Mehmet Celik, Privacy preserving error resilient dna searching through oblivious automata. In Proceedings of the 14th ACM conference on Computer and communications security, CCS'07, pp. 519-528, New York, NY, USA, 2007. ACM.
Tsung-Hsi Tsai. Average case analysis of the boyer-moore algorithm. Random Struct. Algorithms, 28: pp. 481-498, Jul. 2006.
Andrew C. Yao, Protocols for secure computations. In Proceedings of the 23rd Annual Symposium on Foundations of Computer Science, SFCS '82, pp. 160-164, Washington, DC, USA, 1982. IEEE Computer Society.
Andrew Chi-Chih Yao. How to generate and exchange secrets. In Proceedings of the 27th Annual Symposium on Foundations of Computer Science, pp. 162-167, Washington, DC, USA, 1986. IEEE Computer Society.
Joshua Baron, Karim El Defrawy, Kirill Minkovich, Refail Ostrovsky, and Eric Tressler. 5PM: Secure Pattern Matching. Security and Cryptography for Networks. Lecture Notes in Computer Science, vol. 7485, pp. 222-240, 2012.
Erik Hjelmvik & Wolfgang John, "Statistical Protocol IDentification with SPID: Preliminary Results", SNCNW'09: 6th Swedish National Computer Networking Workshop, Uppsala, Sweden, pp. 1-5, May 4, 2009 <http://spid.sourceforge.net/sncnw09-hjelmvik_john-CR.pdf>.
Martin Roesch; Snort Lightweight Intrusion Detection for Networks. LISA 1999 <http://dblp.dagstuhl.de/db/conf/lisa/lisa1999.html#Roesch99> : Nov. 7-12, 1999, pp. 229-238.
"Technical Details of I7-filter," Last updated Dec. 9, 2006, p. 1-2, website http://l7-filter.sourceforge.net/technicaldetails.
Khelife, J., Hajjar, A., & Diaz-Verdejo, J. (Nov. 2011). On the Performance of OpenDPI In Identifying P2P Truncated Flows, In AP2PS 2011, The Third International Conference on Advances in P2P Systems, pp. 79-84.
N. Cascarano, A. Este, F. Gringolt, F. Risso, and L. Salgarelli, "An Experimental Evaluation of the Computational Cost of a DPI Traffic Classifier", Proc. GLOBECOM'09, 2009, pp. 1-8.
Sipser, Introduction the Theory of Computation. PWS, Boston. ISBN 0-534-94728-X. Section 1.1: Finite Automata, pp. 31-47, 1997.
A V Aho, M J Corasick, Efficient string matching: An aid to bibliographic search. Communications of the ACM, 18(6): pp. 333-340, 1975.
eBayes TCP, Adaptive, Model-based Monitoring for Cyber Attack Detection, Keith Skinner & Alfonso Valdes. Lecture Notes in Computer Science, No. 1907. From Recent Advances in Intrusion Detection (RAID 2000). Edited by H. Debar and L. Me and F. Wu. Springer-Verlag, Toulouse, France. Oct. 2000. pp. 80-92.
K. Koscher, A. Czeskis, F. Roesner, S. Patel, T. Kohno, S. Chechoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010, pp. 447-462.
Michael Sipser, Introduction to the Theory of Computation. PWS, Boston. 1997. ISBN 0-534-94728-X. Section 1.1: Finite Automata, pp. 31-47.
W. Maier, et al., "A Minimal Model for the Study of Polychronous Groups," arXiv:0806.1070v1, Condensed Matter. Disordered Systems and Neural Networks, 2008, pp. 1-8.
L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain, pp. I-269-I-272.
L. G. Brown, "A survey of image registration techniques," ACM Comput. Surv., vol. 24, No. 4, pp. 325-376, 1992.
J. J. Hopfield, Neural networks and physical systems with emergent collective computational abilities, Proceedings of the National Academy of Sciences of the USA, vol. 79, No. 8, pp. 2554-2558, Apr. 1982.
P Wang, A DeNunzio, P Okunieff, WG O'Dell. Lung metastases detection in CT images using 3D template matching. Med. Phys. 34 (3), pp. 915-922, Mar. 2007.
Luigi di Stefano, Stefano Mattocoia, Federico Tombari, "An Algorithm for Efficient and Exhaustive Temptate Matching." Jan. 2004; In proceeding of Image Analysis and Recognition: International Conference, ICIAR 2004, Porto, Portugal, Sep. 29-Oct. 1, 2004, Proceedings, Part II. pp. 408-415.
R.S. Boyer, at al., "A fast string searching algorithm," Communications of the ACM. 20; pp. 762-772, 1977.
M. Zubair, et al., "Text scanning approach for exact string matching," International Conference on Networking and Information Technology, 2010, pp. 118-122.
M. Sipser, "Introduction to the Theory of Computation," PWS, Boston, ISBN 0-534-94728-X, Section 1.1; Finite Automata, pp. 31-47, 1997.
W. Maass, et al., "Real-time computing without stable states: a new framework for neural computation based on perturbations," Neural Computation 14(11); pp. 2531-2560, 2002.
A.V. Aho, et al., "Efficient string matching: An aid to bibliographic search," Communications of the ACM, 18(6): pp. 333-340, 1975.
A. Weibel, et al., "Phoneme Recognition Using Time-Delay Neural Networks," IEEE Transactions on Acoustics, Speech, and Signal Porcessing, 37(3): pp. 328-339, 1989.
J.L. Elman, "Finding structure in time," Cognitive Science, 14(2): pp. 179-211, 1990.
E.M. Izhikevich, "Polychroniation: Computation with spikes," Neural Computation, 18(2): pp. 245-282, 2006.
H. Pugam-Moisy, et al., "Delay learning and polychonizaton for resevoir computing," Neurocomputng, 71 (7-9): pp. 1143-1158, 2008.
Notice of Allowance for U.S. Appl. No. 13/749,683, Date mailed: Dec. 10, 2014.

\* cited by examiner

Step 4: Multiply $E(-p_{TH})$ to each element and exponentiate result by random numbers

| $E(r_1(x_{11}-p_{TH}))$ | ... | ... | $E(r_n(x_{1n}-p_{TH}))$ |
|---|---|---|---|
| ... | ... | ... | ... |
| ... | ... | ... | ... |
| ... | ... | ... | $E(r_{n2}((x_{1n}-p_{TH}))$ |

SECURE MULTI-DIMENSIONAL PATTERN MATCHING FOR SECURE SEARCH AND RECOGNITION

CROSS-REFERENCE TO RELATED APPLICATIONS

This is a Continuation-in-Part application of U.S. patent application Ser. No. 13/749,683, filed on Jan. 25, 2013, entitled, "Secure Pattern Matching," which is a non-provisional application of U.S. Provisional Application No. 61/591,207, filed Jan. 26, 2012, and also entitled "Secure Pattern Matching."

This is ALSO a non-provisional application of U.S. Provisional Application No. 61/778,924, filed on Mar. 13, 2013, and entitled, "Secure Multi-Dimensional Pattern Matching for Secure Image Search and Recognition."

BACKGROUND OF THE INVENTION (1) Technical Field

The present invention relates to a recognition system and, more particularly, to a multi-dimensional pattern matching system for secure search and recognition.

(2) Description of Related Art

Pattern matching is fundamental to computer science. Pattern matching is typically a process by which a system searches files or other data in an attempt to recognize an item of interest by matching a pattern with a predetermined or otherwise recognizable pattern. Pattern matching is used in a wide range of applications, such as text-processing, image search, image recognition, database (DB) operations, networking and security applications. In most cases search patterns are one-dimensional. However, in several applications, especially image search and image recognition, the patterns and texts are naturally of higher dimensions (i.e., two or three dimensions). In such cases, traditional one-dimensional pattern matching algorithms and protocols are less efficient than multi-dimensional pattern matching algorithms.

Although multi-dimensional pattern matching algorithms exists (such as G. M. Landau and U. Vishkin, "Pattern matching in a digitized image" Proc. $3^{rd}$ ACM-SIAM Symposium on Discrete Algorithms, pp. 453-462, 1992, and R. M. Karp, R. E. Miller and A. L. Rosenberg, "Rapid identification of repeated patterns in strings, trees and arrays," Proc. 4th ACM Symposium on Theory of Computing, 125-136, 1972, and A. V. Aho and M. J. Corasick, "Efficient String Matching," CACM, Vol. 18, No. 6, 333-340, 1975), there is not currently available any secure multi-dimensional pattern matching algorithms. By "secure", it is meant that the pattern is not revealed to the party holding the text and nothing other than the result of the match is revealed to the party holding the pattern (text and pattern are multidimensional in this case. Thus, existing multi-dimensional pattern matching protocols are not "secure" because they do not provide the guarantees required above (i.e., the pattern is not revealed to the party holding the text and nothing other than the result of the match is revealed to the party holding the pattern).

Further, the computational cost of utilizing existing protocols is prohibitive. For example, multi-dimensional pattern matching can be generalized from single-dimensional secure pattern matching, where the pattern and the text are vectors. Example of single-dimensional protocols include those as described in Literature Reference Nos. 2, 5, 6, and 10 (See the List of Cited Literature References, Literature Reference Nos. 2, 5, 6, and 10). Even in the case where the pattern and text are vectors, the number of exponentiations and bandwidth is at best $O((nm)^d)$. Thus, as the dimension grows, the computational cost grows exponentially.

Other existing secure pattern matching techniques that depend on securely evaluating finite state machines (FSM) (see Literature Reference Nos. 2, 5, and 6) require a number of interaction rounds between a client and server that proportional to the number of states in the FSM. This significantly limits the size of the FSM that can be evaluated efficiently. It also renders the usage of wildcards problematic because they cause a quadratic explosion in the number of states.

As such, a continuing need exists for an efficient and secure multi-dimensional pattern matching without the dramatic computational costs of existing protocols.

SUMMARY OF INVENTION

The present invention is directed to a recognition system and, more particularly, to a multi-dimensional pattern matching system for secure search and recognition. More specifically, the system is directed to multi-dimensional secure pattern matching between two parties, Client and Server, the Client holding a multi-dimensional pattern P and the Server holding a multi-dimensional text T. The system includes one or more processors and a memory, with the memory being a non-transitory computer-readable medium having executable instructions encoded thereon, such that upon execution of the instructions, the one or more processors perform several operations. For example, the processor(s) perform an operation of generating matching results for the Client by determining if P is present in T, such that the Server is not provided any information about P nor matching results, and such that Client is not provided any information about T other than the matching results.

In another aspect, P is an m×m matrix over alphabet $\Sigma$ and wildcard "?".

In yet another aspect, the process of generating matching results further comprises operations of encrypting, by the Client, the m×m matrix with a secret key and a public key; for each i in alphabet $\Sigma$, forming a character delay vector; encrypting each character delay vector element-wise to generate an encrypted character delay vector, which collectively form a set of all encrypted character delay vectors; encrypting a pattern matching threshold to generate an encrypted pattern matching threshold; transmitting both the set of all encrypted character delay vectors and the encrypted pattern matching threshold to a Server; transmitting the public key to the Server so that the Server can encrypt elements; forming an encrypted activation matrix by encrypting element-wise an n×n matrix of all 0s; for each (j,k) in T, where T is an n×n matrix over $\Sigma$, letting i=T(j,k); multiplying element-wise the encrypted character delay vector, starting at T(j,k) of the encrypted activation matrix; multiplying the encrypted pattern matching threshold to each element of the encrypted activation matrix and exponentiating the result by random numbers to generate an randomized encrypted matrix; transmitting the randomized encrypted matrix to the Client; decrypting the randomized encrypted matrix to generate a decrypted randomized matrix; and at each position (j,k) in the decrypted randomized matrix, where the decryption is a 0, recording a match of P with T starting at position (j−m+1, k−m+1).

Finally, the present invention is also directed to a method and computer program product. The method includes acts of causing a process to perform the operations described herein, while the computer program product includes computer-readable instructions stored on a non-transitory computer-readable medium that are executable by a computer for causing the computer to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a recognition system and, more particularly, to a multi-dimensional pattern matching system for secure search and recognition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Finally, details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. Jonathan Katz and Lior Malka, "Secure text processing with applications to private DNA marching", In Proceedings of the 17th ACM conference on Computer and communications security (CCS '10). ACM, New York, N.Y., USA, 485-492 (2010).
2. Carmit Hazay, Rosario Gennaro, Jeffrey Sorensen, "Automata Evaluation and Text Search Protocols with Simulation Based Security," Cryptology ePrint Archive Report, 2010/484 (2010).
3. Mikhail J. Atallah, Florian Kerschbaum, and Wenliang Du. "Secure and private sequence comparisons," In Proceedings of the 2003 ACM workshop on Privacy in the electronic society (WPES '03). ACM, New York, N.Y., USA, 39-44 (2003).
4. Mikhail J. Atallah and Jiangtao Li, "Secure outsourcing of sequence comparisons. Int. J. Inf. Secur. 4, 4, 277-287 (October 2005).
5. Juan Ramon Troncoso-Pastoriza, Stefan Katzenbeisser, and Mehmet Celik, "Privacy preserving error resilient dna searching through oblivious automata," In Proceedings of the 14th ACM conference on Computer and communications security (CCS '07). ACM, New York, N.Y., USA, 519-528 (2007).
6. Marina Blanton and Mehrdad Aliasgari, "Secure outsourcing of DNA searching via finite automata," In Proceedings of the 24th annual IFIP WG 11.3 working conference on Data and applications security and privacy (DBSec'10), Sara Foresti and Sushil Jajodia (Eds.). Springer-Verlag, Berlin, Heidelberg, 49-64 (2010).
7. Robert S. Boyer and J. Strother Moore, "A fast string searching algorithm," Commun. ACM20, 10, 762-772 (October 1977).
8. Alfred V. Aho and Margaret J. Corasick, "Efficient string matching: an aid to bibliographic search," Commun. ACM 18, 6, 333-340 (June 1975).
9. Knuth, D. E., Morris, J. H., & Pratt, V. R., "Fast pattern matching in strings," SIAM Journal on Computing, 6(2), 323-350 (1977).
10. Hazay, C. and Toft, T., "Computationally Secure Pattern Matching in the Presence of Malicious Adversaries," ASIACRYPT (2010).
11. Pascal Paillier, "Public-key cryptosystems based on composite degree residuosity classes," In Proceedings of the 17th international conference on Theory and application of cryptographic techniques (EUROCRYPT'99), Jacques Stern (Ed.). Springer-Verlag, Berlin, Heidelberg, 223-238 (1999).

12. Ivan Damgård and Mats Jurik, "A Generalisation, a Simplification and Some Applications of Paillier's Probabilistic Public-Key System," In Proceedings of the 4th International Workshop on Practice and Theory in Public Key Cryptography: Public Key Cryptography (PKC '01), Kwangjo Kim (Ed.), Springer-Verlag, London, UK, UK, 119-136. (2001).

(2) Principal Aspects

The secure pattern matching protocol according to the principles of the present invention can be incorporated into a system, implemented as a method, or embodied in a computer program product. Thus, the present invention has three "principal" aspects. The first is a pattern matching recognition system. The recognition system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored on any non-transitory computer-readable medium such as in the hard disk memory of a computer or a floppy disk, a CD-ROM, and a flash drive. These aspects will be described in more detail below.

Figure 1:
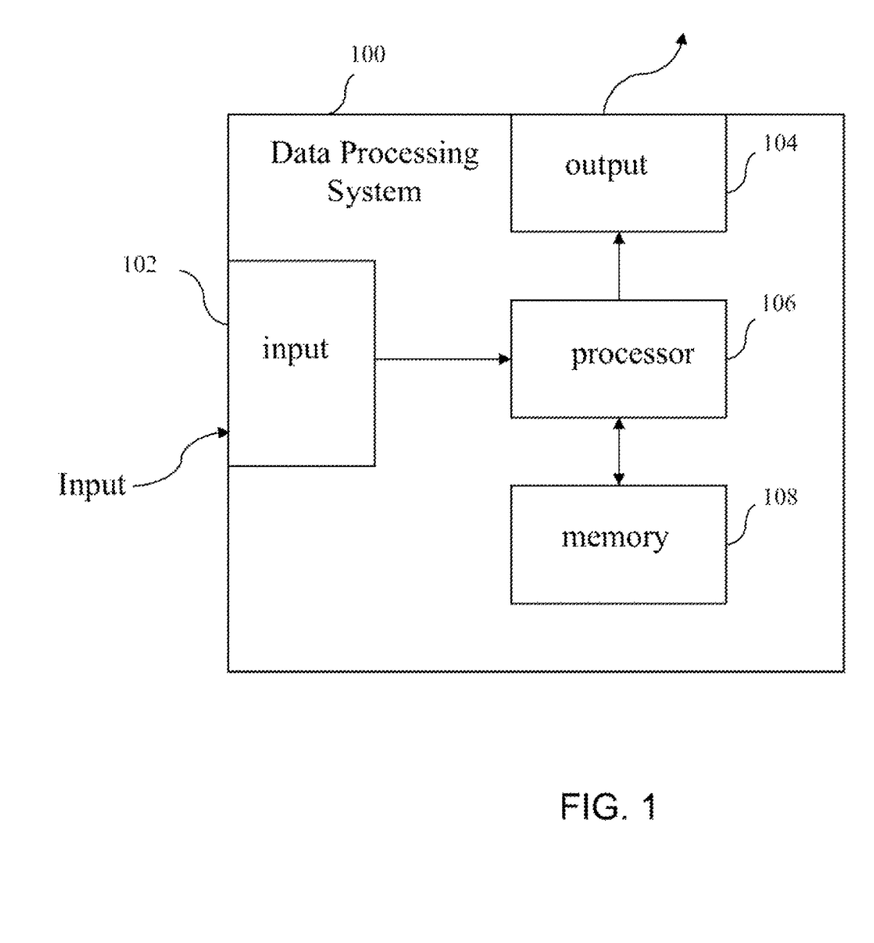
FIG. 1 is a block diagram depicting the components of a system of the present invention.

A block diagram depicting the components of a recognition system of the present invention is provided in FIG. 1. The recognition system 100 comprises an input 102 for receiving information, such as a possible character or number in a data stream. Note that the input 102 may include multiple "ports." Although not limited thereto, input typically comes from a device or source such as a camera, microphone, or the internet. An output 104 is connected with the processor for providing an output matching pattern and/or information regarding a match to a user or to other systems in order that a network of computer systems may serve as a recognition system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
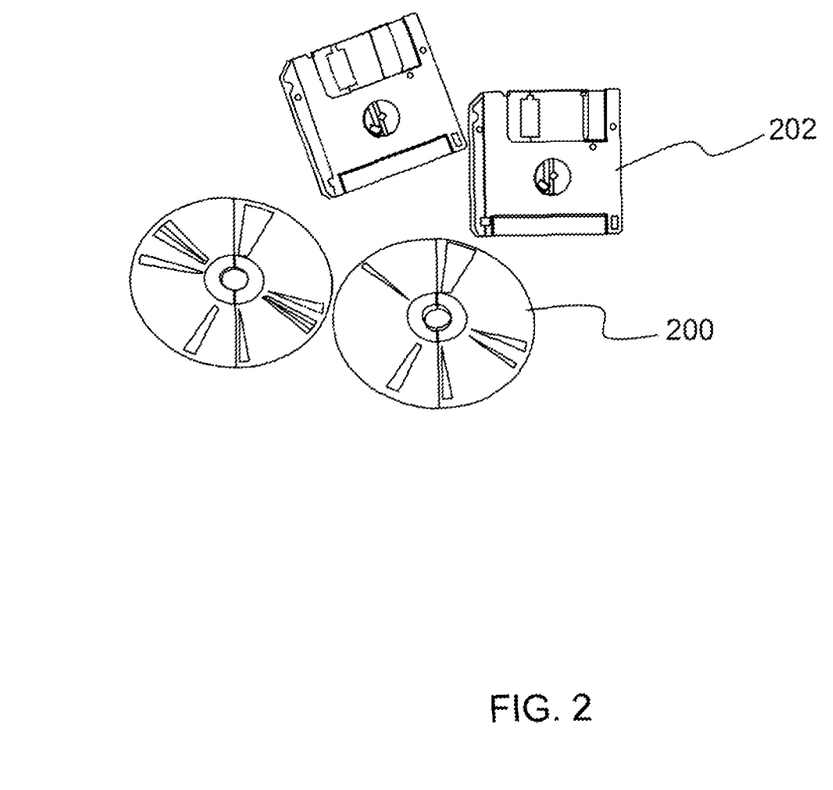
FIG. 2 is an illustration depicting a computer program product embodying the present invention.

An illustrative diagram of a computer program product embodying the present invention is depicted in FIG. 2. The computer program product is depicted as an optical disk 200 such as a CD or DVD, or a floppy disk 202. However, as mentioned previously, the computer program product generally represents computer-readable instructions stored on any compatible non-transitory computer-readable medium.

(3) Introduction

Pattern matching is fundamental to computer science. It is used in a wide range of applications, such as text-processing, image search, image recognition, database (DB) operations, networking and security applications. In most cases search patterns are one-dimensional, but in several applications, especially image search and image recognition, the patterns and texts are naturally of higher dimensions (i.e., two or three-dimensions).

Traditional one-dimensional pattern matching algorithms and protocols are not efficient in searching such multi-dimensional patterns. Even in the case where the pattern and text are vectors, the number of exponentiations and bandwidth is at best work $O((nm)^d)$, where n is the text length in one dimension, m the pattern length in one-dimension, and d is the number of dimensions. Thus, as the dimension grows, the computational cost grows exponentially.

Alternatively, the protocol according to the principles of the present invention requires work $O(m^d+n^d)$. The protocol only relies on homomorphic operations as opposed to generic secure multiparty computation methods, such as those used in (see Literature Reference No. 1), thereby reducing the total amount of communication as compared to the prior art. Thus, described below is an improvement over the prior art that provides a secure protocol by performing secure multi-dimensional pattern matching.

The protocol is to be evaluated between two parties, $P_1$ (or Client) and $P_2$ (or Server). $P_1$ holds a multi-dimensional pattern, p, and $P_2$ holds a multi-dimensional text T (where both p and T have the same dimension). $P_1$ and $P_2$ would then engage in a protocol that allows $P_1$ to find out whether p is present in T or not. The security and privacy requirements are that $P_2$ does not learn any information about p nor the result of the matching. $P_1$ should also not learn any information about T other than whether p is present in it or not. Since the system according to the principles of the present invention provides for multi-dimensional secure pattern matching, it can also take wildcards and substring matching into account. In this case, in d dimensions, T is $n \times \ldots \times n$ (of total size $n^d$) and p is $m \times \ldots \times m$ (of total size $m^d$). Thus, p matches T if there exists an $m \times \ldots \times m$ sub-hypermatrix (or sub-array) of T that equals p. Wildcard and substring matching can be defined by generalizing accordingly, i.e., an $m \times \ldots \times m$ (of total size $m^d$) pattern that include special characters that indicate a wildcard which could match any character in the alphabet.

The secure multi-dimensional pattern matching protocols according to the principles of the present invention can be utilized for a variety of applications. For example, the protocols can be used as a building block to build privacy preserving database query engines (especially on databases of images and multimedia files where the data is generally encoded in multiple dimensions) that support expressive queries in multiple dimensions. As another non-limiting example, the protocol can be used to implement secure evaluation of multi-dimensional deep packet inspection which has several applications in networking security.

Generally speaking, the present invention is a recognition system. It should be noted that although it is described with respect to image search and recognition, the invention is not intended to be limited thereto as it can be applied to any search and recognition platforms, non-limiting example of which include text-processing, image search, image recognition, database (DB) operations, networking and security applications.

(4) Details of the Invention

As noted above, the present invention is generally directed to a secure multi-dimensional pattern matching recognition system. The system builds upon the insecure pattern matching (IPM) algorithm as described by H. Hoffmann in U.S. application Ser. No. 13/358,095, filed on Jan. 25, 2012, and entitled, "Neural Network Device with Engineered Delays for Pattern Storage and Matching," which is hereby incorporated by reference as though fully set forth herein. The IPM algorithm is an efficient search algorithm that supports single character wildcards, exact and approximate pattern matching. It also allows combining a conjunction of patterns into a single pattern and matching the single pattern by using one pass through the search text.

The protocols according to the principles of the present invention extend the IPM algorithm to the multi-dimensional case, which can be implemented as secure in the honest-but-curious (sometimes called semi-honest) model. The resulting invention asymptotically outperforms existing techniques by requiring only a constant number of interaction rounds between the party holding the pattern and the one holding the text to be searched.

Described below are: (A) an overview of how to modify the single-dimensional flexible insecure pattern matching algorithm (IPM) (as described in U.S. application Ser. No. 13/358,095), to work in the two dimensional case; (B) an overview of modifying IPM to be secure in the honest-but-curious (HBC) adversary model; (C) a brief description of the correctness and security as provided for by the multi-dimensional secure pattern matching protocol; and (D) a description of the resulting computational efficiency. p (A) Overview of Modifying the IPM The following protocol is described as a two-dimensional model but can be easily modified to work in the d-dimensional case by increasing the number of dimensions from two to d. This is described with respect to a two dimensional n×n matrix T, and an m×m pattern P over an alphabet Σ. First, consider an exact matching case.

Figure 3:
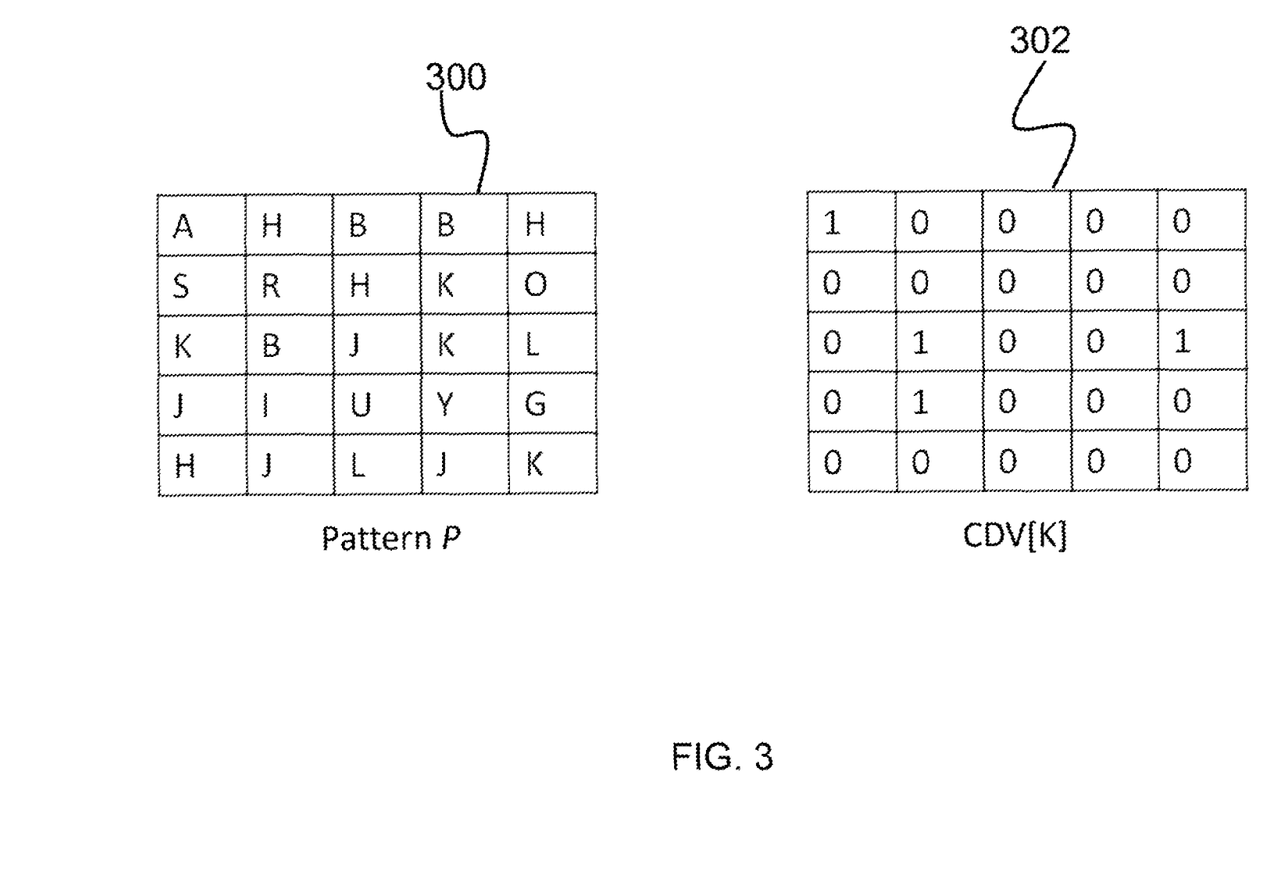
FIG. 3 is a table illustrating Character-Delay Vectors (CDV)
Figure 4:
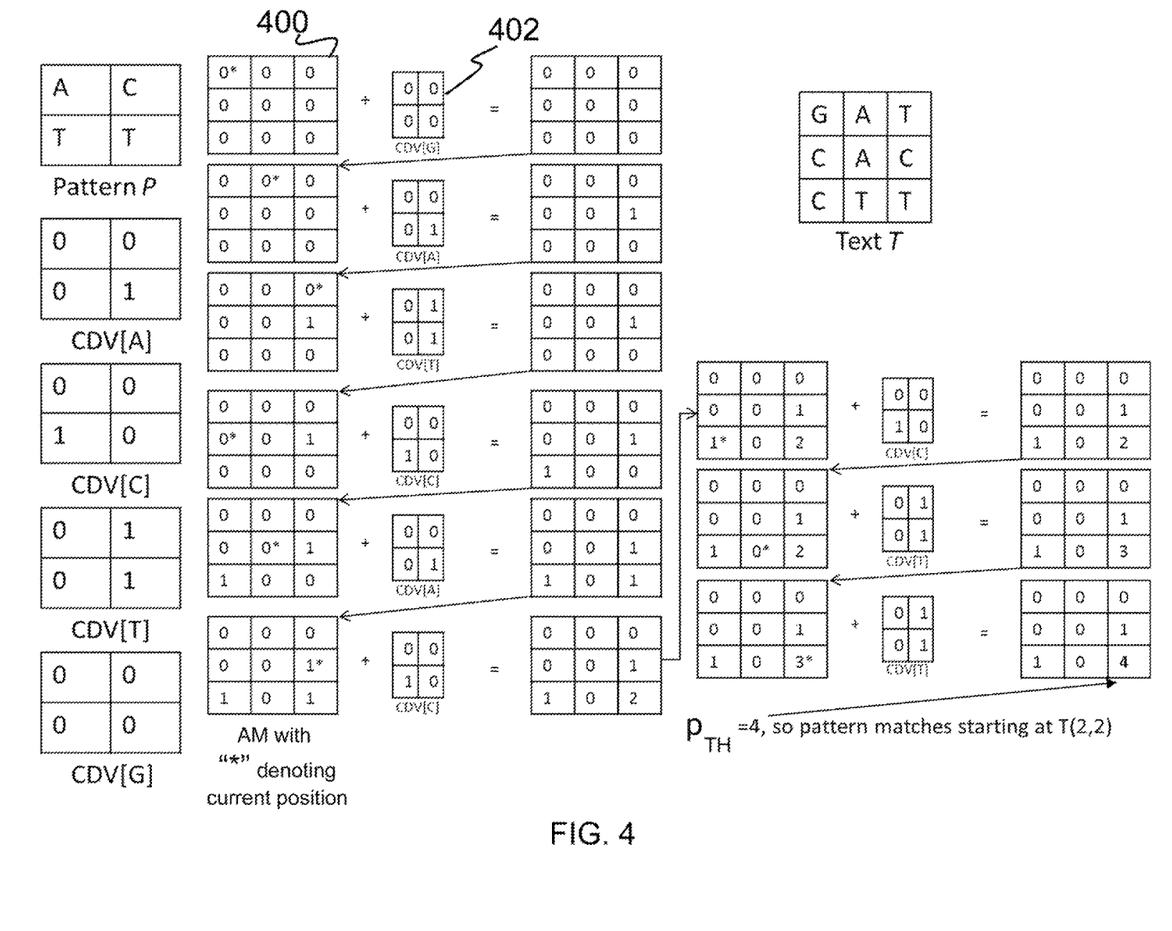
FIG. 4 is an illustration depicting an example of insecure pattern matching in two-dimensions with a DNA alphabet.
Figure 5A:
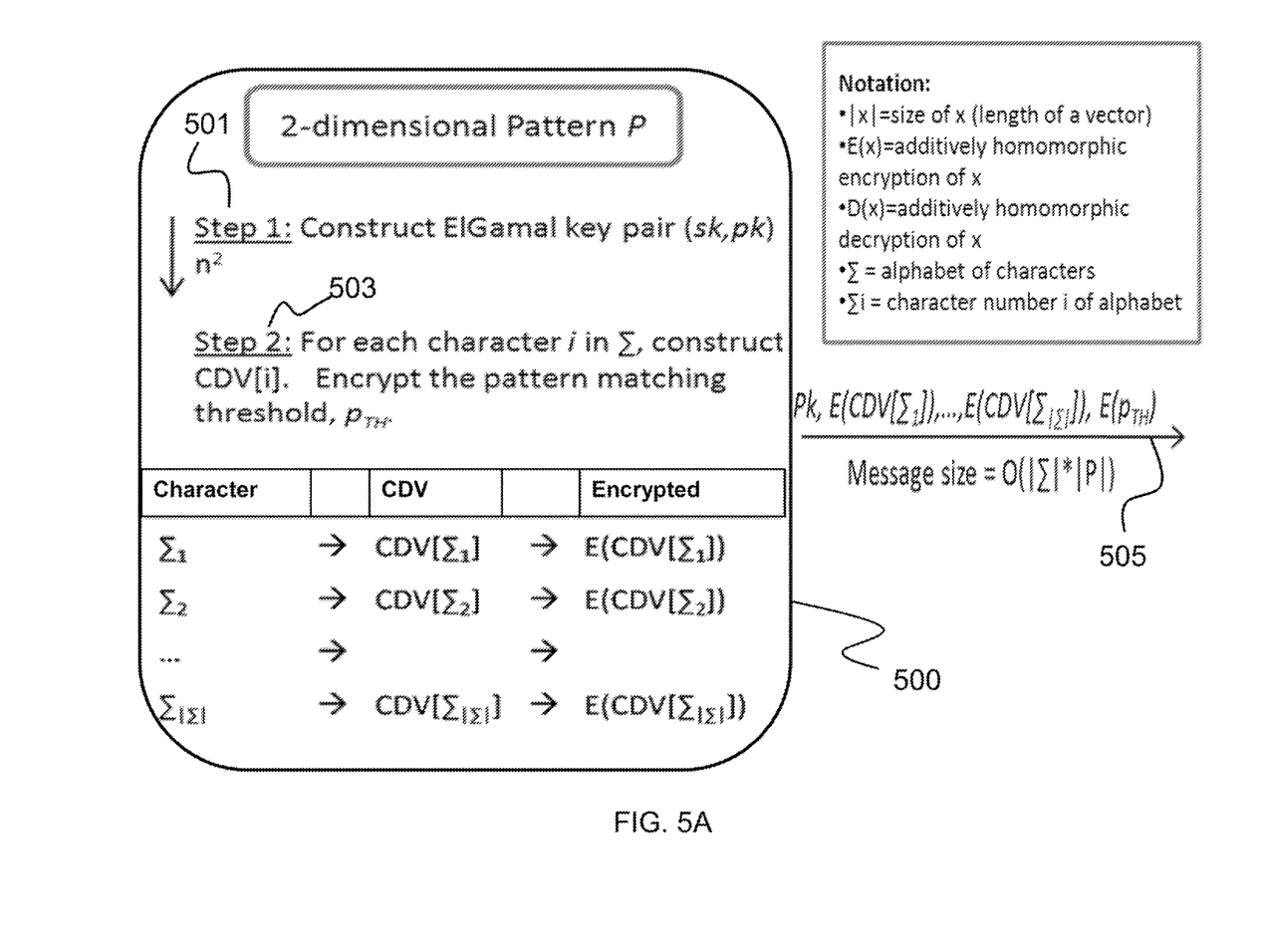
FIG. 5A is a flow chart depicting a process of secure multi-dimensional secure pattern matching ($H^d$-SPM) according to the principles of the present invention.
Figure 5B:
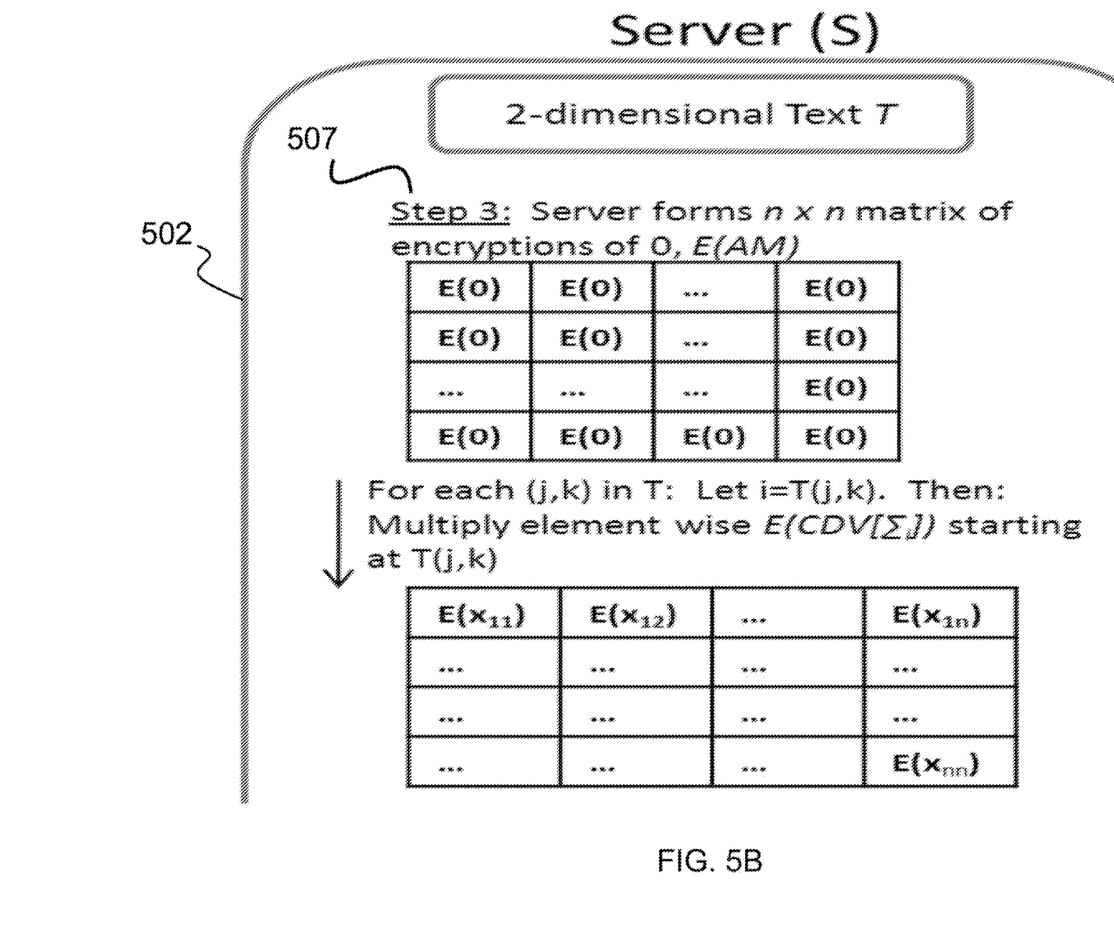
FIG. 5B is a flow chart depicting the process of secure multi-dimensional secure patient matching ($H^d$-SPM) according to the principles of the present invention.
Figure 5C:
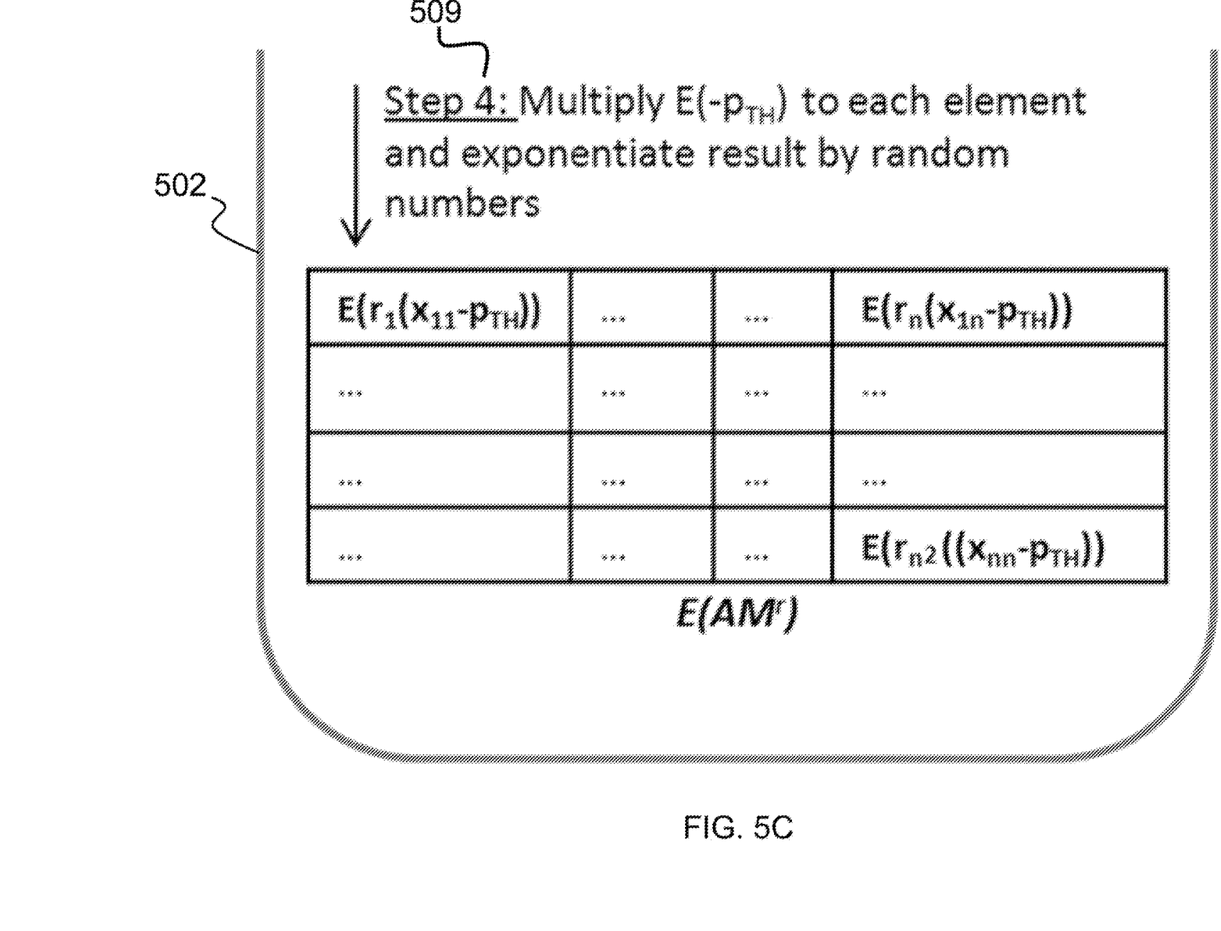
FIG. 5C is a flow chart depicting the process of secure multi-dimensional secure pattern matching ($H^d$-SPM) according to the principles of the present invention.
Figure 5D:
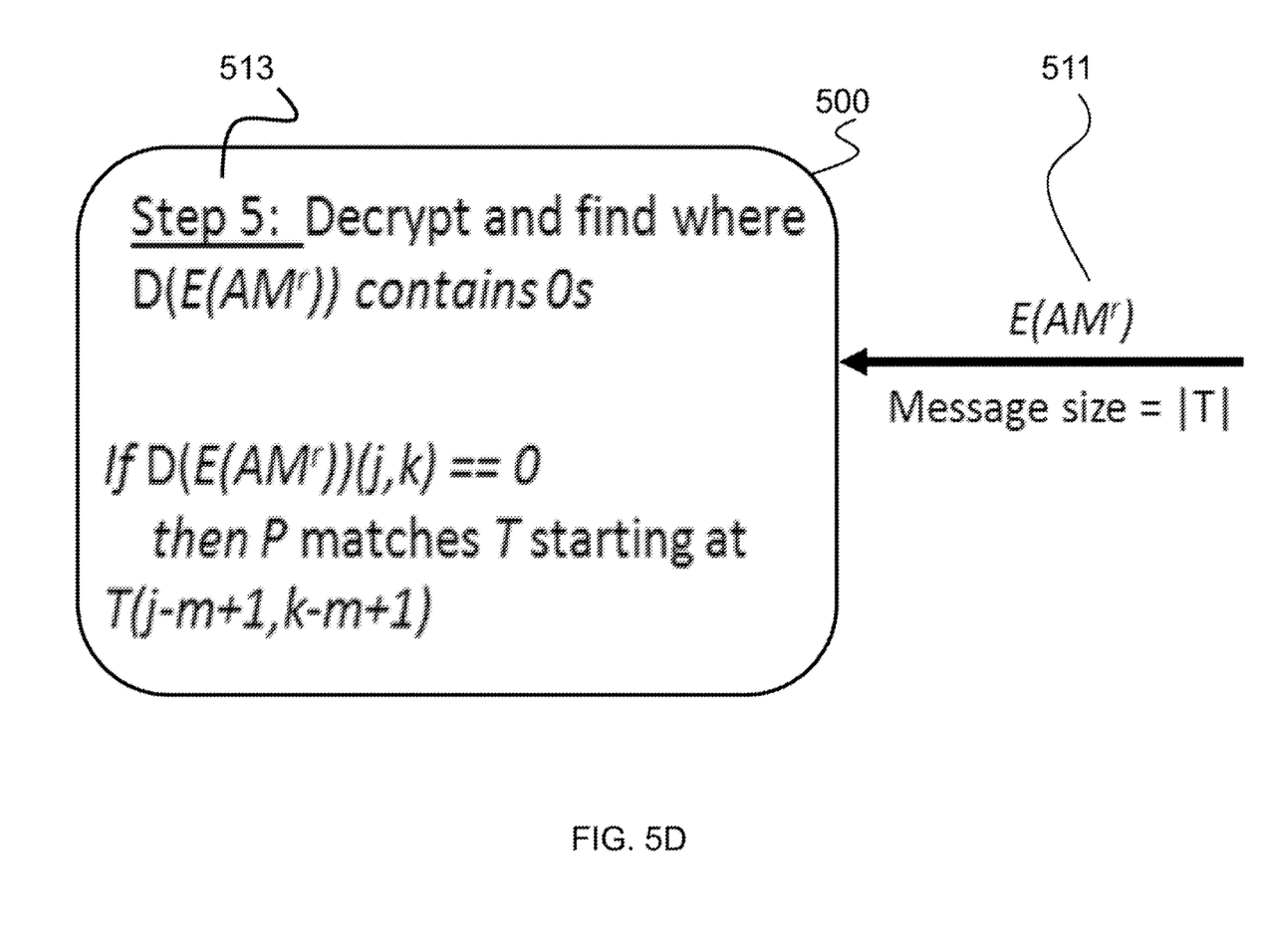
FIG. 5D is a flow chart depicting the process of secure multi-dimensional secure pattern matching ($H^d$-SPM) according to the principles of the present invention.

IPM involves the following main steps:
1. Step 1: As shown in FIG. 3, the pattern P 300 can be pre-processed; for each character i in Σ, create a matrix denoted CDV[i] 302, which is an m×m matrix such that CDV[i](j,k), which is the j,k entry of CDV[i], is a 1 if and only if the (m−j+1,m−k+1) position of P is i. Every other entry of CDV[i] is 0. These 1s are termed delay values. Note that a character can occur several times in each pattern, so there may be more than one delay value.
2. Step 2: An n×n activation matrix (AM), thought of as a vector even though it is a matrix, tracks matching of input characters from the text. It is this matrix that will be checked to determine if there is a match or not. In particular, a matching threshold $p_{TH}$ that is searched for is defined; a match exists if and only if $p_{TH}$ is found in AM. In the exact match case, $p_{TM}=m^2$.
3. Step 3: For each entry (j,k) of the matrix T. As shown in FIG. 4, let i be the entry T(j,k). Then the matrix CDV[i] 402 is added entry wise to the matrix AM 400 element-wise starting in position (j,k) (through (j+m−1, k+m−1)). If the elements of CDV[i] being added to AM exceed the size of the matrix, then they are not added to AM.
4. Step 4: AM is checked to see if any entry of AM is $p_{TH}$. If there is a matching of P in T then $p_{TH}$ will be found in AM. If $p_{TH}$ is found at the $(j,k)^{th}$ location of AM, then the pattern P would have started at the $(j-m+1,k-m+1)^{th}$ position of T.

Wildcard and substring matching: Single character wildcards can be handled in IPM by representing the single character wildcard with a special character, e.g., "?". When "?" is encountered in the pattern preprocessing phase it is simply ignored. Additionally, at the last step when elements of the AM are searched in the comparison phase, the threshold value $p_{TH}$ being compared against will be $m^2-1$ instead of $m^2$, where 1 is the number of occurrences of "?" in the pattern. The intuition behind single character wildcards is that by reducing the threshold for each wildcard the algorithm implicitly skips matching that position in the text, allowing that position of the pattern to correspond to any character. Substring matching, or matching text substrings of Hamming distance $m^2-1$ from the pattern, is handled similarly to single character wildcards; the threshold value $p_{TH}$ being compared against in the AM is decreased to $m^2-1$.

Adapting to the d-dimensional case: The above protocol can be adapted to the d-dimensional case (e.g., the text T is n× . . . ×n, while the pattern P is m× . . . ×m) by setting each CDV[i] to be the $m^d$ hypermatrix with a 1 in the $(m-j_1, \ldots, m-j_d)$ position where i is in the $(j_1, \ldots, j_d)$ position of P. AM is an $n^d$ hypermatrix, and for each position of T, the corresponding CDV hypermatrix is added element-wise to AM corresponding to the position in T. In the exact match case, $p_{TH}=m^d$. In the case where there are 1 wildcards or in substring matching, $p_{TH}=m^d-1$.

(B) Modifying IPM to be Secure in the Honest-but-Curious (HBC) Adversary Model

Securing IPM in the HBC model requires the use of an additively homomorphic encryption scheme. Additively homomorphic encryption schemes are semantically secure encryption schemes with plaintext space P and ciphertext space C such that the addition operation + can be computed on the plaintexts at the level of the ciphertext, as follows: $E(x)*E(y)=E(x+y)$, wherein E denotes being encrypted and x and y denote two values from the plain text space, respectively.

Examples of such homomorphic encryption schemes include, for example, the work by Paillier and Damgard et al. (see Literature Reference Nos. 11 and 12), which are hereby incorporated by reference as though fully set forth herein. Multiplication of the plaintext by a constant a is naturally supported by additively homomorphic encryption schemes using exponentiation: $E(x)^a=E(ax)$.

The IPM algorithm above can then be modified to create the multi-dimensional secure pattern matching ($H^d$-SPM) protocol that is secure in the HBC adversary model. There are two issues to be addressed in the HBC model, namely (1) hiding pattern characters from the Server and (2) hiding everything except matching text positions from the Client. To hide information about the pattern, the CDVs have to be encrypted element-wise; note that CDVs of alphabet characters not present in the pattern consist of encryptions of 0, so no information about the pattern is revealed.

If the Client received the unencrypted activation matrix, AM, they can infer certain private information about the text. Specifically, a value of 1 in AM implies that the previous in characters in T (inclusive) have Hamming distance m−1 from the pattern. Such an information leakage would violate the security requirements. To address this, the Server must blind the values of AM. This blinding can be achieved after subtracting the encrypted matching threshold m (or m−1 in the single character wildcard/substring case); therefore, the only positions in the AM corresponding to matches are those containing 0s. Each element is then randomized by multiplying it by a random number (if this element is encrypted in an additively homomorphic scheme, the encrypted values are exponentiated by random numbers) to hide the non-zero entries. The positions representing matches will remain encryptions of 0 while other positions will correspond to encryptions of random values that do not reveal anything about the text other than a non-match. If it is required that the Client only learns the number of occurrences of the pattern in the text, then the Server can randomly permute elements of AM to hide the matched positions.

The multi-dimensional secure pattern matching ($H^d$-SPM) protocol for the HBC model is implemented as follows. First, assume T is an n×n matrix over $\Sigma$, P is an m×m matrix over $\Sigma$ and *, and perform the following steps (as illustrated in FIGS. 5A through 5D):

1. Step 1 501: Client 500 sets up an instantiation of additive ElGamal (or any appropriate additively homomorphic encryption scheme) with secret key sk and public key pk. In cryptogrophay, the ElGamal encryption system is an asymmetric key encryption algorithm for public-key cryptography that is well known and commonly understood by those skilled in the art.
2. Step 2 503: For each i in $\Sigma$, Client 500 forms CDV[i] as specified in IPM above. Client 500 encrypts each CDV[i] element-wise. Each encrypted CDV[i] is denoted as E(CDV[i]) with the set of all encrypted CDVs denoted as E(CDV). Client 500 sends 505 E(CDV) to Server 502 as well as E($p_{TH}$), where $p_{TH}$ is the pattern matching threshold. Client 500 also sends 505 pk to Server 502 so that the Server 502 can also encrypt elements.
3. Step 3 507: Server 502 initializes E(AM) by encrypting element-wise an n×n matrix of all 0s. For each (j,k) in T, let i=T(j,k). Server 502 multiplies element-wise E(CDV|$\Sigma_i$|) starting at the (j,k)th position of E(AM), which will be the encrypted activation matrix. Note that this has the effect of adding the delay values in the encrypted activation matrix since multiplication of ciphertexts corresponds to adding the plaintexts.
4. Step 4 509: Server 502 multiplies E($p_{TH}$)$^{-1}$=E($-p_{TH}$) to each element of E(AM). Server 502 then exponentiations each element of E(AM) by a random element; this is because the matching positions of E(AM) now correspond to encryptions of 0s (everywhere else is an encryption of an element that may yield information about the text T). Exponentiating each encryption by a random number multiplies the plaintext by a random number; matching positions remain 0 but non-matching positions are now random numbers. This new matrix is denoted as randomized encrypted matrix E(AM').
5. Step 4a (optional): Server 502 randomly permutes E(AM'). This is done only in the case that Server 502 wishes to hide the pattern match locations from the Client 500. This new matrix is also referred to as E(AM'). In either case, Server 502 sends 511 Client 500 E(AM').
6. Step 5 513: Client 500 decrypts E(AM'). At each position (j,k) where the decryption is a 0, Client 500 records a match of P with T starting at position (j−m+1, k−m+1). In the case where the pattern match locations are hidden, Client 500 records a yes that P matches T somewhere if there is a 0, and a no otherwise.

Adopting to the d-dimensional case: Adopting $H^d$-SPM to the d-dimensional case follows directly from the adaptation on the 2-dimensional case (as described above in modifying IPM to the d-dimensional case). An additively homomorphic encryption scheme is used to add the values even in encrypted form, with random exponentiation of E(AM).

(C) Correctness and Security

Correctness or accuracy of $H^d$-SPM follows from security of IPM since $H^d$-SPM serves only to mask the real values; they are manipulated in the same manner in IPM as in $H^d$-SPM, just through the encryption. The only step that is different is the masking step (Step 4 of $H^d$-SPM), which does not affect correctness.

Security follows from the semantic security of the additively homomorphic encryption scheme, which is to say, security is based upon the hardness assumption of the encryption scheme. In the case of ElGamal, security depends on the difficulty of the Decisional Difie-Hellman (DDH) problem. The DDH problem is a commonly understood term to those skilled in the art. Generally speaking, the DDH problem is as follows: Given some group G and group elements g, and the elements $g^a$, $g^b$ and $g^c$, determine whether $g^c = g^{ab}$.

The security of $H^d$-SPM follows from the fact that all the Server 502 receives from the Client 500 is a number of encryptions. If the Server 502 could learn anything from these encryptions, the encryption scheme would not be secure, which violates the semantic security of the encryption scheme. The Client 500 cannot learn anything about the Server's 502 text because of Step 4 of $H^d$-SPM; namely, the vector sends back exactly the matching positions, and all other encryptions are uniformly distributed over the plaintext.

(D) Computational Efficiency

The computational efficiency of the present invention is dramatically greater than the prior art. As referenced below, efficiency of the system is described in the d-dimensional case. First, consider $|\Sigma|$ to be a constant. The Client 500 must encrypt $|\Sigma|$ CDVs of size $m^d$ and must decrypt E(AM'), which is of size $n^d$. Therefore, Client 500 must do $O(m^d+n^d)$ exponentiations for ElGamal. The server 502 must perform $O(n^d m^d)$ multiplications in Step 3 of $H^d$-SPM and $n^d$ exponentiations in Step 4. Accordingly, the total number of encryptions/decryptions is $O(m^d+n^d)$, the total number of exponentiations is $O(n^d)$, and the total number of multiplications is $O(n^d m^d)$. The total bandwidth is $O(m^d+n^d)$, since the Client 500 must send the $|\Sigma|$ CDVs of size $m^d$ and the Server must send E(AM'), which is of size $n^d$.

What is claimed is:

1. A computer implemented method for multi-dimensional secure pattern matching between two parties, Client and Server, the Client holding a multi-dimensional pattern P and the Server holding a multi-dimensional text T, the method comprising an act of causing a computer having a processor to execute instructions encoded upon a memory, such that upon execution, the processor performs an operation of:

generating matching results for the Client by determining if P is present in T, such that the Server is not provided any information about P nor the matching results, and such that the Client is not provided any information about T other than the matching results;

wherein P is a m×m pattern matrix over alphabet $\Sigma$ and a wildcard; and wherein generating the matching results further comprises operations of:

encrypting, by the Client, the pattern matrix with a secret key and a public key;

for each i in alphabet $\Sigma$, forming a character delay vector;

encrypting each character delay vector element-wise to generate an encrypted character delay vector, which collectively form a set of all encrypted character delay vectors;

encrypting a pattern matching threshold to generate an encrypted pattern matching threshold;

transmitting both the set of all encrypted character delay vectors and the encrypted pattern matching threshold to the Server;

transmitting the public key to the Server so that the Server can encrypt elements;

forming an encrypted activation matrix E(AM);

for each (j,k) in T, where T is a text matrix over $\Sigma$, letting i=T(j,k);

multiplying element-wise the encrypted character delay vector corresponding to text character i with the encrypted activation matrix E(AM), starting at position (j,k) of the encrypted activation matrix E(AM);

multiplying the encrypted pattern matching threshold to each element of the encrypted activation matrix E(AM) and exponentiating the result by random numbers to generate an randomized encrypted matrix;

transmitting the randomized encrypted matrix to the Client;

decrypting the randomized encrypted matrix to generate a decrypted randomized matrix; and at each position (j,k) in the decrypted randomized matrix, where the decryption is a 0, recording a match of P with T starting at position (j−m+1, k−m+1).

2. A computer program product for multi-dimensional secure pattern matching between two parties, Client and Server, the Client holding a multi-dimensional pattern P and the Server holding a multi-dimensional text T, the computer program product comprising:

a non-transitory computer-readable medium having executable instructions encoded thereon, such that upon execution of the instructions by one or more processors, the one or more processors perform operations of:

generating matching results for the Client by determining if P is present in T, such that the Server is not provided any information about P nor the matching results, and such that the Client is not provided any information about T other than the matching results;

wherein P is a m×m pattern matrix over alphabet $\Sigma$ and a wildcard; and wherein generating the matching results further comprises operations of:

encrypting, by the Client, the pattern matrix with a secret key and a public key;

for each i in alphabet $\Sigma$, forming a character delay vector;

encrypting each character delay vector element-wise to generate an encrypted character delay vector, which collectively form a set of all encrypted character delay vectors;

encrypting a pattern matching threshold to generate an encrypted pattern matching threshold;

transmitting both the set of all encrypted character delay vectors and the encrypted pattern matching threshold to the Server;

transmitting the public key to the Server so that the Server can encrypt elements;

forming an encrypted activation matrix E(AM);

for each (j,k) in T, where T is a text matrix over $\Sigma$, letting i=T(j,k);

multiplying element-wise the encrypted character delay vector corresponding to text character i with the encrypted activation matrix E(AM), starting at position (j,k) of the encrypted activation matrix E(AM);

multiplying the encrypted pattern matching threshold to each element of the encrypted activation matrix E(AM) and exponentiating the result by random numbers to generate an randomized encrypted matrix;

transmitting the randomized encrypted matrix to the Client;

decrypting the randomized encrypted matrix to generate a decrypted randomized matrix; and at each position (j,k) in the decrypted randomized matrix, where the decryption is a 0, recording a match of P with T starting at position (j−m+1, k−m+1).

3. A system for multi-dimensional secure pattern matching between two parties, Client and Server, the Client holding a multi-dimensional pattern P and the Server holding a multi-dimensional text T, the system comprising:

one or more processors and a memory, the memory being a non-transitory computer-readable medium having executable instructions encoded thereon, such that upon execution of the instructions, the one or more processors perform operations of:

generating matching results for the Client by determining if P is present in T, such that the Server is not provided any information about P nor the matching results, and such that the Client is not provided any information about T other than the matching results wherein P is a m×m pattern matrix over alphabet $\Sigma$ and a wildcard; and wherein generating the matching results further comprises operations of:

encrypting, by the Client, the pattern matrix with a secret key and a public key;

for each i in alphabet $\Sigma$, forming a character delay vector;

encrypting each character delay vector element-wise to generate an encrypted character delay vector, which collectively form a set of all encrypted character delay vectors;

encrypting a pattern matching threshold to generate an encrypted pattern matching threshold;

transmitting both the set of all encrypted character delay vectors and the encrypted pattern matching threshold to the Server;

transmitting the public key to the Server so that the Server can encrypt elements;

forming an encrypted activation matrix E(AM);

for each (j,k) in T, where T is a text matrix over $\Sigma$, letting i=T(j,k);

multiplying element-wise the encrypted character delay vector corresponding to text character i with the encrypted activation matrix E(AM), starting at position (j,k) of the encrypted activation matrix E(AM);

multiplying the encrypted pattern matching threshold to each element of the encrypted activation matrix E(AM) and exponentiating the result by random numbers to generate an randomized encrypted matrix;

transmitting the randomized encrypted matrix to the Client;

decrypting the randomized encrypted matrix to generate a decrypted randomized matrix; and at each position (j,k) in the decrypted randomized matrix, where the decryption is a 0, recording a match of P with T starting at position (j−m+1, k−m+1).

* * * * *